United States Patent [19]

Gust

[11] Patent Number: 5,709,926
[45] Date of Patent: Jan. 20, 1998

[54] RECLAIMABLE TRANSPARENCIES FOR PLAIN PAPER COPIERS

[75] Inventor: Stephen J. Gust, Greenville, S.C.

[73] Assignee: Hoechst Diafoil Company, Greer, S.C.

[21] Appl. No.: 683,337

[22] Filed: Jul. 18, 1996

[51] Int. Cl.$^6$ ............................... G03G 13/20; B32B 3/00
[52] U.S. Cl. ..................... 428/206; 428/193; 427/412.1; 525/187; 430/99
[58] Field of Search ................. 430/99, 127; 427/412.1; 428/195, 206, 447, 480; 524/366; 525/187

[56] References Cited

U.S. PATENT DOCUMENTS

| | | | |
|---|---|---|---|
| 3,322,553 | 5/1967 | Seifried et al. | 117/7 |
| 4,214,035 | 7/1980 | Heberger | 428/340 |
| 4,571,363 | 2/1986 | Culbertson et al. | 428/332 |
| 4,910,325 | 3/1990 | Shen et al. | 558/260 |
| 5,182,338 | 1/1993 | Gaggar | 524/366 |
| 5,208,092 | 5/1993 | Iqbal | 428/195 |
| 5,281,504 | 1/1994 | Kanbayashi et al. | 430/99 |
| 5,310,591 | 5/1994 | Dodge et al. | 428/195 |
| 5,310,595 | 5/1994 | Ali et al. | 428/206 |
| 5,326,688 | 7/1994 | Stimson et al. | 430/527 |
| 5,424,120 | 6/1995 | Culbertson | 428/336 |

FOREIGN PATENT DOCUMENTS 1411564  10/1975  United Kingdom.

OTHER PUBLICATIONS

"Principals of Polymerization" George Odian, 2nd ed., John Wiley's & Sons.

*Primary Examiner*—John Goodrow
*Attorney, Agent, or Firm*—Gregory N. Clements

[57] ABSTRACT

Reclaimable overhead transparencies for plain paper copiers are obtained by strongly adhering particulates having a large mean particle size to a transparent base sheet. A transparent, polymeric antistatic binder composition which does not substantially gel or yellow upon heating to reclamation temperatures and a glycidoxy silane are used to strongly adhere the large particulates to the base sheet. The polymeric antistatic binder composition is a mixture of an acrylic polymer or copolymer with an antistatic copolymer. The use of large particulates and the use of the mixture of an acrylic polymer or copolymer and an antistatic copolymer improves antistatic properties without the need for yellowing, foul-odor producing amounts of nitrogenous antistatic agents or gel-forming amounts of cross-linking agents which would adversely affect reclaimability. An emulsified wax is included in the coating composition to reduce the static coefficient of friction of the overhead transparency. The coating composition may be applied in-line to the transparent base sheet to obtain an image-recording surface coating comprising: a) from about 60% by weight to about 85% by weight of the polymeric antistatic binder composition, b) from about 5% by weight to about 20% by weight of a glycidoxy silane, c) from about 3% by weight to about 12% by weight of a wax, and d) from about 3% by weight to about 15% by weight of a particulate material having a mean particle size of from 4 µm to 15 µm, preferably from 7 µm to 12 µm, the weight percentages of components a) through d) adding up to 100%. The reclaimable image receptive transparencies exhibit anti-newton ring properties and may be used as layout montage material, and in solid ink jet printers or electrostatic printers.

46 Claims, No Drawings

RECLAIMABLE TRANSPARENCIES FOR PLAIN PAPER COPIERS

FIELD OF THE INVENTION

This invention relates to reclaimable transparencies having a transparent base coated with a transparent coating for receiving an image in a plain paper copier. The present invention also relates to methods for the continuous production of the reclaimable transparent sheets.

BACKGROUND OF THE INVENTION

Overhead transparencies for plain paper copiers must be capable of receiving and holding toner upon one or more surfaces while being sufficiently transparent for projection of clear, crisp images using an overhead projector. Plain paper copiers may be used to copy an image onto an overhead transparency or they may be used to copy an image from a transparency to another transparent sheet or plain paper. In either case, the overhead transparency should be capable of continuous or repeated feeding from a stack of sheets through the plain paper copier without singulation or jamming problems. The tendency for stacked sheets to cling together may be reduced by the inclusion of antistatic agents or particulate materials in the transparent coating. The particulate materials creates surface roughness which facilitates the separation of stacked sheets and the passage of the sheets over plain paper copier rollers without jamming. Although the inclusion of particulate materials in the coating may increase surface haze, generally some haze is desirable to mask scratches or fingerprints which may be incurred upon the surface during production of the sheets or during their use. Increased surface roughness may be achieved with fewer particles by increasing the particle size. However, a strong, durable binder is needed to permanently adhere larger sized particulates on the transparent base sheet.

Crosslinking agents have been used in film coating compositions to enhance the adhesive qualities of film and the durability of film coatings. However, as disclosed in U.S. Pat. No. 4,571,363 to Culbertson, et al., crosslinking agents may give rise to undesirable yellowing or discoloration when subjected to recycling temperatures. Significant amounts of scrap film are generated during the film-forming process. Scrap film is normally comminuted, melted, extruded into the form of pellets, mixed with fresh virgin polymer, re-melted and re-fed to the film forming extruder. Temperatures of about 270° C. to about 310° C. may be encountered during such processing of polymer reclaim film. Thus, for reclamability, the coating on an overhead transmission transparency must be stable at such temperatures and not impart an undesirable yellow or black discoloration to finished film containing significant amounts of the reclaimed film.

In the production of oriented films, scrap is generated along the longitudinal edges of the film where it is held and stretched by tenters. To avoid the production of coated scrap which may not be reclaimable, the scrap may be removed prior to coating. However, additional processing is involved where oriented films are made at one location, rolled into jumbo rolls, transported to another location, unrolled and coated with an image-receptive coating. In-line coating of film saves time and is more economical. A coating composition for in-line application to a film surface should generally be quickly settable or curable for compatibility with film production rates. Additionally, the coating composition should be capable of being drawn with the substrate without undergoing deterioration in adhesiveness, strength, and transparency.

U.S. Pat. No. 5,310,591 to Dodge et al and U.S. Pat. No. 5,310,595 to Ali et al disclose image receptive sheets for plain paper copiers wherein the image-receptive coating is coated onto film during the actual manufacturing of the film, rather than subsequent to the formation of the film. The coating contains from about 65 to about 99.9 parts of an imageable polymer, from about 0.1 to about 15 parts of at least one polymeric particle having a mean particle size ranging from about 1 μm to about 15 μm and from 0 to about 20 parts of an antistatic agent. The imaging polymer is a copolymer formed with from about 1 part to about 20 parts of a polar monomer.

It has been found that the use of nitrogenous-containing antistatic agents and cross-linking agents in the image-receptive coating of overhead transparencies tends to result in yellowing, discoloration and foul odors when subjecting sheets or scraps containing the coating to reclamation temperatures. Additionally, it has been found that the use of cross-linking agents in polymeric coatings tends to form membrane gels or cross-linked gels during reclamation which are deleterious to the production of films from reclaimed polymer.

The present invention provides image receptive transparencies which do not undergo substantial gel formation or yellowing or discoloration upon being subjected to reclaiming temperatures. Particulates having a large mean particle size are used to improve singulation and improve antistatic properties without the need for yellowing, foul-odor producing amounts of nitrogenous antistatic agents and crosslinking agents. The large particulates are strongly adhered to the base sheet without the need for gel-forming amounts of cross-linking agents which would adversely affect reclaimability. The reclaimable or recyclable transparencies may be continuously produced by coating a base sheet during the base sheet manufacturing operation. The coating composition can be subjected to drawing during orientation of the substrate or base sheet without undergoing deterioration in adhesiveness, strength, and transparency. The overhead transparencies of the present invention may be continuously fed through a plain paper copier from a stack without misfeeding or jamming. They receive and retain toner without substantial ruboff to provide long-lasting, clear, crisp images for projection with an overhead projector.

SUMMARY OF THE INVENTION

A transparent, polymeric antistatic binder composition which does not substantially cause gel formation or yellowing during reclamation is used to strongly adhere large particulates to an oriented polymeric base sheet to provide reclaimable or recyclable image-receptive transparencies. The preferred polymeric base sheet or film is a polyethylene terephthalate (polyester) film. The transparencies of the present invention can be continuously fed through plain paper copiers without singulation or jamming problems. The large particulates provide surface bumps or roughness so that contiguous sheets do not contact each other on their entire surfaces. The roughness helps to reduce singulation and facilitates passage of individual sheets through plain paper copiers. Nitrogenous antistatic agents and nitrogenous crosslinking agents may be reduced and controlled to avoid: (1) the production of membrane gels during reclamation grinding, and (2) yellowing, discoloration, and foul odors at reclamation temperatures of at least about 250° C., for example from about 270° C. to about 310° C. The amount of crosslinker in the coating may be less than about 6% by weight, based upon the weight of the polymeric antistatic binder composition. The total amount of nitrogenous antistatic compounds used in producing the coating may be from about 21% by weight to about 55% by weight based upon the weight of the polymeric antistatic binder composition.

A glycidoxy silane is included in the coating composition to promote bonding between the polymeric antistatic binder composition and silica gel particulates to securely anchor or hold the particles. The coefficient of friction of the toner receptive coating may be lowered by inclusion of a wax without adversely affecting the adhesion of particles or reclaimability.

The transparent toner-receptive coating comprises: a) from about 60% by weight to about 85% by weight of the polymeric antistatic binder composition, b) from about 5% by weight to about 20% by weight of a glycidoxy silane, c) from about 3% by weight to about 12% by weight of a wax, and d) from about 3% by weight to about 15% by weight of a particulate material having a mean particle size of from 4 μm to 15 μm, preferably from 7 μm to 12 μm, the weight percentages of components a) through d) adding up to 100%. The transparent coating may be coated on one or both sides of the transparent base sheet.

The polymeric antistatic binder composition comprises an acrylic polymer or copolymer and an antistatic copolymer. Use of the mixture of copolymers helps to control coating durability, adhesiveness, and conductivity as well as yellowing, discoloration, odor, and gelling under reclamation temperatures.

The acrylic polymer or copolymer adheres to and binds to the substrate polymer or base sheet and holds the particulate material. It is essentially free of nitrogenous components. The preferred acrylic polymer or copolymers are copolymers of methyl methacrylate and ethyl acrylate. The acrylic polymer or copolymer may be used in an amount of from about 25% by weight to about 55% by weight, based upon the weight of components a) through d).

The antistatic copolymer promotes conductivity of the coating and may contain non-yellowing, non-gelling amounts of one or more copolymerized nitrogenous antistatic monomers and one or more copolymerized monomeric crosslinkers. The antistatic copolymer may be used in an amount of from about 20% by weight to about 45% by weight, preferably from about 20% by weight to about 40% by weight, based upon the weight of components a) through d). The antistatic copolymer is a copolymer of: 1) from about 60% by weight to about 85% by weight of a quaternary salt of an alkylamino acrylamide or an alkylamino acrylate, 2) from about 5% by weight to about 40% by weight of one or more acrylates, and 3) from 0 to about 10% by weight of a crosslinker, wherein the total of the weight percentages of components 1, 2, and 3 equals 100%. The preferred quaternary salt is the dimethyl sulfate quaternary salt of dimethylaminoethyl methacrylate. Ethyl acrylate and/or methyl methacrylate are the preferred acrlates. The preferred crosslinker is N-methylolacrylamide.

The reclaimable or recyclable tranparencies may be continuously produced by the in-line coating of a base sheet with an aqueous-based coating composition having from about 2% by weight to about 17% by weight solids, and drying the composition upon the base sheet. The coating composition can be subjected to drawing during orientation of the substrate or base sheet without undergoing deterioration in adhesiveness, strength, and transparency. In embodiments of the invention, the coating on each side of the base sheet may have a weight of from 0.003 g/m$^2$ to 0.4 g/m$^2$. The transparent image-recording sheets of the present invention may, in embodiments of the invention, have a surface resistivity of less than about $5 \times 10^{12}$, preferably less than about $1.4 \times 10^{12}$, most preferably less than about $1.25 \times 10^{12}$ ohms/square, a static coefficient of friction of less than about 0.32, preferably less than about 0.30, most preferably less than about 0.28, and a surface smoothness of preferably less than about 3000 Bekk seconds.

The coating compositions may also be used to produce reclaimable image-receptive transparent sheets or film having anti-newton ringing properties for use as a layout montage material in the graphics arts field. The reclaimable image-receptive transparencies of the present invention may also be used in black and white, or color solid ink jet printers and electrostatic printers.

DETAILED DESCRIPTION OF THE INVENTION

The present invention provides reclaimable or recyclable overhead transparencies for plain paper copiers. The reclaimable transparencies of the present invention exhibit anti-newton ringing properties and may be used as layout montage material in the graphic arts field. They may also be used in solid ink jet printers or electrostatic printers, either of which may be black and white or color printers.

The transparencies comprise a transparent base sheet coated on at least one image-recording surface with a transparent toner-receptive coating. Continuous production of the transparencies may be achieved by the in-line coating of base sheet film with an aqueous-based coating composition. The transparencies and coated scrap generated during their manufacture may be subjected to reclamation temperatures without substantial yellowing or discoloration. Embodiments of the invention may be subjected to reclamation temperatures of at least about 250° C., for example from about 270° C. to about 310° C. The reclaimable sheets and scraps do not substantially produce non-recyclable membrane gels or foul odors during the reclamation process. Upon being subjected to grinding during the reclamation process, the coating on the sheets forms small particles, if any, which do not significantly affect reclaimed film properties.

The transparent base sheet may be any polymeric film capable of acting as a substrate for the transparent coating. Exemplary polymeric films which may be used include those made from one or more polyesters, cellulose acetates, polycarbonates, polyvinyl chlorides, polystyrenes, or polysulfones, and mixtures thereof. The preferred transparent substrate film or base sheet is polyester film, most preferably polyethylene terephthalate. The present invention can also utilize other polyesters such as polybutylene terephthalate, or copolyesters such has polyethylene terephthalate isophthalate. Generally, any transparent polyester film based on a polymer resulting from the polycondensation of a glycol or diol with a dicarboxylic acid (or the ester equivalents) such as terephthalic acid, isophthalic acid, sebacic acid, malonic acid, adipic acid, azelaic acid, glutaric acid, suberic acid, succinic acid, and the like, or mixtures of these, can be employed in the present invention. Exemplary glycols which may be used are ethylene glycol, diethylene glycol, polyethylene glycol, and polyols such as butanediol, and the like.

Any of the above polymeric films can contain conventional additives such as antioxidants, delusterants, pigments, fillers such as silica, calcium carbonate, kaolin, titanium dioxide, u.v. stabilizers, plasticizers, etc., all of which are well known in the art, which do not adversely affect transparency.

Additionally, the polymeric film may comprise a polymeric laminate of two or more transparent polymeric films, such as a polymer—polymer laminate of two different polyester films, or a polyester-polystyrene laminate. The preferred film is a single layer polyethylene terephthalate (polyester) film.

The substrate film or base sheet thickness may be any sheet thickness compatible for use in a plain paper copier. Exemplary film thicknesses range from about 50 µm to about 200 µm. Preferred film thicknesses range from about 3 mil to about 5 mil.

The film may be produced by manufacturing techniques well known in the art. For example, polyester film may be made by melt extruding polyester as an amorphous sheet onto a polished revolving casting drum to form a cast sheet of the polymer. Thereafter, the polyester sheet is actually stretched or drawn in one or more directions, to orient the film and provide it with sufficient physical properties. For example, the film may be drawn in the direction of extrusion (longitudinal), or perpendicular to the direction of extrusion (transverse). Biaxially oriented film is drawn in both directions. For polyester film, the amount of stretching, to impart strength and toughness to the film, generally ranges from about 2.5 to about 5.0 times the original cast sheet dimensions in one or more directions. The stretching operations for any polymeric film are generally carried out at temperatures in the range from about the second order transition temperature of the polymer to below the temperature at which the polymer softens and melts.

Where necessary, the film is heat treated, after stretching, for a period of time necessary to crystallize the polymer film. Crystallization imparts stability and good tensile properties to the film. When a polyester, such as polyethylene terephthalate, is heat treated, it is subjected to a heat setting temperature in the range of between about 190° C. and about 240° C.

The coating composition of the present invention is applied to the film preferably in the form of an aqueous dispersion but may also be in an organic solvent solution such as alcohol, for example. An aqueous dispersion is preferred for both environmental reasons and the health of employees. The toner-receptive coating composition may be applied off-line after the film manufacturing process, but it is preferably applied in-line during the film manufacturing process. For in-line coating, the coating composition may be applied in the pre-draw stage, i.e. before the film is stretched in any direction, as disclosed in British Patent No. 1,411,564, or between stages, if a biaxially oriented film is being produced, as disclosed, for example, in U.S. Pat. No. 4,214,035. In other embodiments, the coating composition may be applied post draw, but before heat setting as disclosed, for example, in U.S. Pat. No. 3,322,553. In one preferred embodiment, the coating is applied in-line, after the film is uniaxially stretched, but before the film is stretched in the opposite direction. Generally, the heat applied to the film during the stretching or final conditioning stages is sufficient to evaporate off the water and other volatiles and dry and optionally cross-link the coating composition. In embodiments of the invention, drying ovens may be used to dry the coating after stretching.

Regardless of when the coating composition is applied to the polymeric film, it is preferred to make the surface of the polymeric film more receptive to bonding with the coating composition. Such surface treatments are well known in the art and corona treatment is the most popular. For polyester, corona treatment of about 3–7 watts/ft$^2$/min. may be employed.

The film or substrate may be coated with the toner-receptive coating composition by any well known technique employed in the art. For example, the coating composition may be applied by a roller, by spray coating, by slot coating, by immersion coating, reverse gravure roll coating, or gravure roll coating.

Once the permanent antistatic coating composition is applied to the film, the aqueous portion (or organic solvent, if solvent based) of the composition evaporates leaving a dried coating on the film. The coating composition, when applied to the film, may be such to yield a final dry coating on a weight basis, of from 0.003 g/m$^2$ to 0.4 g/m$^2$.

Although water is the preferred carrier for the coating composition, water/organic solvents could also be employed. Exemplary organic solvents which may be used include alcohols, chlorinated hydrocarbons, esters, ethers, glycol and ether/ester derivatives, ketones, and dimethyl formamide.

The coating composition may contain from about 2% by weight to about 17% by weight solids, with the remainder being water or a water/organic solvent. Higher solids levels may result in agglomeration of the particles into larger particles or clumps of particles which will tend to precipitate from the solution as grit. Lower solids level creates a burden on the process to adequately dry all the coating composition necessary to achieve the desired solids level.

The coating composition and the transparent toner-receptive coating obtained by evaporation of the carrier may comprise: a) from about 60% by weight to about 85% by weight of a polymeric antistatic binder composition, b) from about 5% by weight to about 20% by weight of a glycidoxy silane, c) from about 3% by weight to about 12% by weight of a wax, and d) from about 3% by weight to about 15% by weight of a particulate material having a mean particle size of from 4 µm to 15 µm, preferably from 7 µm to 12 µm, the weight percentages of components a) through d) adding up to 100%.

The polymeric antistatic binder composition does not substantially form gels or yellow upon heating to reclamation temperatures. In embodiments of the invention, to prevent substantial membrane gel formation upon reclamation, the amount of optional crosslinker in the coating may be less than about 6% by weight, based upon the weight of the polymeric antistatic binder composition. Also, to control yellowing and odor during reclamation, while assuring the attainment of a conductive film, the total amount of nitrogenous antistatic compounds used in producing the coating may be from about 21% by weight to about 55% by weight based upon the weight of the polymeric antistatic binder composition.

The polymeric antistatic binder composition is a combination of an acrylic polymer or copolymer and an antistatic copolymer. Coating durability, adhesiveness, and conductivity as well as gel formation, yellowing, discoloration, and odor at reclamation temperatures may be controlled by the use of the mixture of copolymers.

The acrylic polymer or copolymer adheres to and binds to the substrate polymer or base sheet and holds the particulate material. It is essentially free of nitrogenous components, such as amines, amides, and quaternary ammonium salts which may cause yellowing, discoloration, or foul odors upon reclamation. The acrylic polymers or copolymers used as a binding component consist essentially of at least about 50% by weight of one or more polymerized acrylic and/or methacrylic monomers and from 0% to 50% by weight of one or more non-yellowing, halogen-free non-acrylic monoethylenically unsaturated monomers interpolymerized therewith. Examples of the optional, non-acrylic comonomers include dialkyl maleates such as dioctyl maleate, di-isooctyl maleate and dibutyl maleate; vinyl esters of versatic acid; vinyl acetate, and styrene.

Preferred acrylic monomers which may be used to obtain the acrylic polymer or copolymer are esters of acrylic acid or methacrylic acid, especially an alkyl ester wherein the alkyl group contains up to ten carbon atoms such as methyl, ethyl, n-propyl, isopropyl, n-butyl, isobutyl, tertbutyl, hexyl, 2-ethyl, hexyl, heptyl and n-octyl. Acrylic copolymers derived from a lower alkyl ($C_1$ to $C_4$) acrylate, especially ethyl acrylate, together with a lower alkyl methacrylate provide particularly effective adhesion to the polyester film. Acrylic copolymers comprising an alkyl acrylate, e.g. ethyl acrylate or butyl acrylate, together with an alkyl methacrylate, e.g. methyl methacrylate, are particularly preferred. The acrylate comonomer of such acrylic/methacrylic combinations may be present in a proportion in the range 15 to 65 weight percent. The methacrylate may be present in a proportion in the range of 35 to 85 weight percent, with the weight percentages of acrylate comonomer and methacrylate comonomer adding up to 100% by weight. In preferred embodiments, the methacrylate comonomer may preferably be in a proportion exceeding that of the acrylate comonomer generally by an amount in the range of 5 to 20 weight percent.

The acrylic polymer or copolymer can be prepared using conventional polymer synthesis such as described in "Principles of Polymerization" by George Odian, second edition, published by John Wiley and Sons. The acrylic polymer or copolymer may be used in an amount of from about 25% by weight to about 55% by weight, based upon the weight of components a) through d).

The antistatic copolymer promotes conductivity of the coating. It may be used in an amount of from about 20% by weight to about 45% by weight, preferably from about 25% by weight to about 40% by weight, based upon the weight of components a) through d). The antistatic copolymer may contain non-yellowing, non-gelling amounts of one or more copolymerized nitrogenous antistatic monomers and one or more copolymerized monomeric crosslinkers. The antistatic copolymer is a copolymer of: 1) from about 60% by weight to about 85% by weight of a quaternary salt of an alkylamino acrylamide (AAA) or an alkylamino acrylate (AAL), or mixtures thereof, 2) from about 5% by weight to about 40% by weight of one or more acrylates, and 3) from 0 to about 10% by weight of a crosslinker, wherein the total of the weight percentages of components 1, 2, and 3 equals 100%.

Quaternary salts of alkylamino acrylates (AAL) which may be used in embodiments of the present invention may be represented by the generic formula (I):

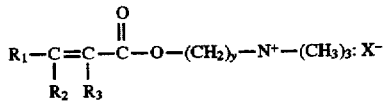

wherein $R_1$, $R_2$ and $R_3$ may be the same or different and may be hydrogen, or an alkyl containing 1–8 carbon atoms; y is 1 to 8; and X may be anions selected from halogens such as chloride; sulfates; sulfonates; alkyl sulfonates such as methyl sulfonate; carbonates; alkyl carbonates such as methyl carbonate; nitrates; phosphates; alkyl phosphates; and the like, or mixtures thereof.

Preferably, $R_1$ and $R_2$=hydrogen, $R_3$=methyl, y=2 and X=methyl sulfonate, forming the dimethyl sulfate quaternary salt of dimethylaminoethyl methacrylate (CAS Registry #6891-44-7), sold under the tradename MAD QUAT Q5 by Norsolac, Inc. of N.C.

The quaternary salts of alkylamino acrylamides (AAA) which may be used in the present invention may be represented by the generic formula (II):

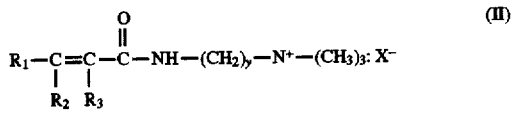

wherein $R_1$, $R_2$ and $R_3$ may be the same or different and may be hydrogen, or an alkyl containing 1–8 carbon atoms; y is 1 to 8; and X may be anions selected from halogens such as chloride; sulfates; sulfonates; alkyl sulfonates such as methyl sulfonate; carbonates; alkyl carbonates such as methyl carbonate; nitrates; phosphates; alkyl phosphates; and the like, or mixtures of these.

The quaternary salts of the alkylamino acrylamides (AAA) may be produced in accordance with U.S. Pat. No. 4,910,325 issued to Shen, et al.

Exemplary acrylates which may be used to produce the antistatic copolymer may be methyl acrylate, ethyl acrylate, propyl acrylate, butyl acrylate, hexyl acrylate, octyl acrylate, 2-ethyl-hexyl acrylate, methacrylate, methylmethacrylate, ethyl methacrylate, propyl methacrylate, and the like. More than one acrylate may be employed. Preferably, ethyl acrylate and/or methyl methacrylate are employed.

Exemplary crosslinkers for the antistatic copolymer may be self crosslinking components such as N-methylolacrylamide and N-methylolanhydride, acrylic acid, alkyl alcohol, maleic acid, maleic anhydride, acrylamide or methacrylamide crosslinked with melamine formaldehyde or urea formaldehyde, aziridines, glycouril-formaldehyde, glyoxal, formaldehyde, diacrylamide acetic acid or other suitable crosslinkers. The preferred crosslinker of the present invention is N-methylolacrylamide. The optional crosslinker is employed in amounts which do not result in the substantial production of gel particles or membrane gels when the coating composition is subjected to reclamation temperatures. In preferred embodiments, the only crosslinker present in the coating composition is a crosslinker which is a comonomer in the antistatic copolymer. For example, the only crosslinker present in the coating composition may be N-methylolacrylamide which is present in the antistatic copolymer. The amount of the N-methylolacrylamide may be less than about 6% by weight, based upon the weight of the polymeric antistatic binder composition.

The antistatic copolymer may be prepared by a conventional polymer synthesis at a temperature from about 40° to 60° C. as described in "Principles of Polymerization" by George Odian, second edition, published by John Wiley and Sons. In practice, the monomer components (AAA/AAL, acrylate(s), and optional crosslinker) and one or more various surfactants may be slowly metered into an aqueous solution. The various surfactants may be anionic or nonionic surfactants. Exemplary nonionic surfactants are alkylphenol ethoxylates, such as octyl phenol ethoxylate available from Rohm & Hass Co. in Philadelphia, Pa., or from Union Carbide Corp. in NY, N.Y.; or BASF in Spartanburg, S.C. Exemplary anionic surfactants include sodium lauryl sulfate or sodium dodecylbenzene sulfonate. The aqueous solution may also contain a redox initiator system. Typical initiators for polymerization reactions are peroxide compounds such as lauryl peroxide, benzoyl peroxide, methyl ethyl ketone peroxide, and the like.

As in all polymerization reactions, water quality is an important consideration. Deionized water should be used since the presence of certain multivalent ions in uncontrolled concentrations can interfere with both the initiation process and the action of any emulsifier.

As the comonomer is slowly metered into the water containing the surfactants and the initiator, copolymerization of the two or more comonomers begins, thereby forming particles of the coating composition.

Near the completion of the copolymerization reaction, the reaction mixture will comprise small particles suspended in water due to the nonionic and anionic surfactants. This mixture may typically have a solids level of from 25 to 30 percent. It may be used at that concentration, or diluted with water or solvent, or concentrated, or dried for admixture with the other coating composition components, such as the acrylic polymer or copolymer. For example, the antistatic copolymer may be diluted to about 2% by weight to about 12% by weight solids with the remainder being water or a water/organic solvent. The diluted mixture may then be combined with the remaining coating composition components.

A glycidoxy silane is included in the coating composition to promote bonding between the polymeric antistatic binder composition and the particulate component to securely anchor or hold the particles. The glycidoxy silane may be glycidoxypropyltrimethoxysilane or glycidoxypropylmethyldiethoxysilane, or generally any glycidoxy silane represented by the formula X—Y—Si—$R_1R_2R_3$, i.e.

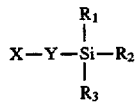

where X is a glycidoxy group, Y is an alkylene group, such as methylene, ethylene, propylene, etc., $R_1$ and $R_2$ are hydrolyzable groups, such as methoxy, ethoxy, acetoxy, and the like, and $R_3$ may be a hydrolyzable group or a non-hydrolyzable group. If $R_3$ is a non-hydrolyzable group, it may be an alkyl such as methyl, ethyl, and the like, or aryl such as phenyl, naphthyl, and the like. These silanes may possess water solubility or water dispersibility, as well as solvent solubility/dispersibility. A commercially available glycidoxypropyltrimethoxysilane which may be used in the present invention is Z6040 produced by Dow Corning.

The amount of glycidoxy silane employed may be from about 5% by weight to about 20% by weight, based on the total weight percentages of components a) through d). Less than about 5% by weight does not improve rub-off significantly, while more than 20% by weight may result in excessive stickiness, an increase in rub-off, and an increase in coefficient of friction.

Particulates having a large mean particle size are used in the transparent coating of the present invention to improve singulation and improve antistatic properties without the need for yellowing, foul-odor producing, non-reclaimable amounts of nitrogenous antistatic agents and crosslinking agents. The particulate material creates surface roughness or bumps which facilitates the separation of stacked sheets and the passage of the sheets over plain paper copier rollers without jamming. The roughness or bumps help to reduce the tendency of stacked sheets to cling to each other by preventing contiguous sheets from contacting each other on their entire surfaces. The particulate material also prevents blocking and permits further processing of the coated film.

Although the inclusion of particulate materials in the coating may increase surface haze, generally some haze is desirable to mask scratches or fingerprints which may be incurred upon the surface during production of the sheets or during their use. Increased surface roughness may be achieved with fewer particles by increasing the particle size. However, the particles should not be so large that ruboff increases to undesireable levels.

The amount and size of the particles employed are based on the percentage by weight employed, the particle diameter and the particle size distribution. In embodiments of the invention, the particles may be approximately spherical in nature. If the amount and/or size of the particles is too low, surface roughness is insufficient. If the amount and/or size of the particles is too high, too much haze and ruboff tends to occur. In embodiments of the present invention, the coating composition contains from about 3% by weight to about 15% by weight of a particulate material having a mean particle size of from 4 µm to 15 µm, preferably from 7 µm to 12µm, based upon the sum of the weight percentages of components a) through d).

The preferred particulate materials for use in the coating composition are silica gels, which are also known as synthetic amorphous silica, amorphous silicon dioxide, and silicic acid. Commercially available silica gels which may be employed are Syloid Silica Gels, sold by W. R. Grace, such as Syloid 63, 64, 66, 68, 71, 72, 74, 76, 77, 79, 82, or 83, or mixtures thereof. These products have a a silica particle density of from about 0.55 to about 1.05 gms/cc, an average pore diameter of 150 Angstroms, and average particle sizes in the range of 4 µm to 9 µm. Syloid 74 is a preferred silica gel for use in the present invention. It has an average particle size of 8 µm, a silica particle density of about 0.65 gms/cc, and an average pore diameter of 150 Angstroms. Product compatible polymeric particles, such as acrylics, which are non-yellowing and non-gelling when subjected to reclamation conditions may be used alone or in combination with silica gel.

The coefficient of friction of the toner-receptive coating may be lowered by inclusion of a wax which does not adversely affect the adhesion of particles or reclaimability. Exemplary waxes which may be used are emulsions of oxidized, low-molecular weight polyolefins, such as polyethylene or polypropylene. Emulsified waxes based upon polyethylene are preferred. Commercially available emulsifiable waxes based upon polyethylene are Epolene E waxes, sold by Eastman Kodak. While solid waxes may be used, they are more difficult to incorporate into an aqueous-based coating composition without emulsifying them prior to addition. In preferred embodiments, commercially available semi-translucent or translucent emulsified waxes based upon Epolene E waxes are employed, such as MICHEM emulsion 18325 or MICHEMLUBE 18130, produced by Michelman, Inc., Cincinnati, Ohio. The preferred emulsions may have a solids content of from about 23% by weight to about 32% by weight, based upon the weight of the wax emulsion, a Brookfield viscosity of less than 50 cps, and a pH of about 8 to 10. The emulsified waxes may be used in coefficient of friction lowering amounts of from about 3% by weight to about 12% by weight, based upon the total weight of components a) through d).

The coating compositions of the present invention may be produced by admixing the solvent, which is preferably water, with the remaining components at room temperatures with mixing to avoid agglomeration and to obtain a substantially homogeneous dispersion. In a preferred mixing procedure, the glycidoxy silane is added to the water to hydrolyze the silane. The acrylic polymer or copolymer may then be added with continued mixing, followed by addition of the antistatic copolymer with mixing to form a substantially homogeneous mixture. Then, with continued mixing, the emulsified wax may be added, followed by addition of the particulate material, which is preferably silica gel. In other embodiments of the invention, the acrylic polymer or copolymer may be premixed with the antistatic copolymer and the premix may be added to the water.

The overhead transparencies of the present invention may have a surface resistivity of less than about $5 \times 10^{12}$, preferably less than about $1.4 \times 10^{12}$, most preferably less than about $1.25 \times 10^{12}$ ohms/square. Films having a surface resistivity which is too high may not adequately dissipate static charge. Films having a surface resistivity less than $10^9$ ohms are considered to be conductive or semiconductive, but are not economically beneficial for most antistatic applications. Surface resistivity (SR) may be measured using ASTM D257-66 at 23° C. and 50% relative humidity. In this procedure, surface conductivity of the film is measured in amps which is converted to surface resistivity in ohms/square by the equation:

SR (ohms/square)=26,700/conductivity (amps).

The surface resistivity may be determined by a Keithley Model 6105 capable of measuring from $10^3$ to $5 \times 10^{18}$ ohms/square at 50% relative humidity. Static decay may also be determined in accordance with Federal Test Method Standard 101B, method 4046. The static decay may be determined on a ETS (Electro-Tech Systems, Inc.) Model 406B.

Good antistatic film can dissipate a charge very quickly. Generally, antistatic films which demonstrate the capability of dissipating an induced 5,000 volt charge within 2.0 seconds are satisfactory.

The transparent image-recording sheets of the present invention may have a static coefficient of friction and a kinetic coefficient of friction of less than about 0.32, preferably less than about 0.30, most preferably less than about 0.28. Values above 0.35 tend to impede singulation and increase jamming.

The static and kinetic coefficients of friction (COFs and COFk, respectively) may be determined using ASTM 1894 wherein the coefficient of friction is measured between the opposite or the same sides of a material.

The surface smoothness of the overhead transparencies of the present invention may preferably be less than about 3000 Bekk seconds, as measured using a Bekk smoothness tester made for ISO 5627 and TAPPI-T479 test standards (made by Messer Buchel, Holland). Lower Bekk numbers indicate greater surface roughness.

The internal and surface haze (percent HI and percent HS, respectively) may be measured pursuant to ASTM D1003 using a Gardner Hazemeter. In embodiments of the invention, the overhead transparencies may exhibit an internal haze of from about 0.2 to about 2.0 and the surface haze may range from about 1.75 to about 7.0.

Surface roughness Rz, Ra in microns may be measured using a MAHR Perthometer. Exemplary roughness values which may be obtained may range from about 0.02μ to about 0.05μ for Ra, and from about 0.2μ to about 1.5μ for Rz wherein higher values indicate higher roughness.

Singulation may be tested by placing a stack of sheets, for example, at least about 25 sheets, generally from about 100 to 300 sheets, in the feeding tray of a plain paper copy machine. The number of times the machine jams because of multiple feeds or failure to pick up a sheet is recorded. Generally results vary from machine to machine. The transparencies may be rated as good, marginal, or bad depending upon the relative number of machine jams recorded.

Toner adhesion may be evaluated by passing several overhead transparencies samples through a copy machine to image a transparency. The samples may then be checked for image permanency using four test methods: (1) the eraser test, (2) the thumb nail test, (3) the impact test, and (4) the tape test. In the eraser test, the sheet is rubbed twenty times with an eraser. Rubbing back and forth counts as one rub. In the thumb nail test, the toner is scratched once. In the impact test, a finger is flicked against the toner. In the tape test, Scotch 610 tape is pulled against the toner. These are subjective tests where the samples may be compared with any of a number of commercially available overhead transparencies samples. All samples are rated from zero (no failure) to 5 (massive failure). In this test, a rating of 0–1 may be considered positive, a rating of 2–3 may be considered neutral or zero, and a rating of 4–5 may be considered as negative.

The overhead transparencies may be evaluated for "rub-off" and for "smear" by rubbing about one square inch of the overhead transparency with a piece of clean Kimberly Clark teri cloth no. 34790. In the "rub-off" test, the sample is graded for loss of particles. In the "smear" test, the sample is graded for coating smear. The two tests are subjective. In the "rub-off" test, a grade of zero indicates no loss of particles and a grade of 5 indicates a total loss of particles. In the "smear" test, a grade of zero indicates no smearing and a grade of 5 indicates unacceptable smearing. In both tests a rating of 0–1 may be considered positive, a rating of 2–3 may be considered neutral or zero, and a rating of 4–5 may be considered as negative.

In evaluating reclaimability, a delta yellowness index (Hunter Labs YI based on L,a,b color) due to the coating at about 200 ppm per mil of film may be used to evaluate yellowness compared to other reclaimable coatings and films. Reclaimability may also be evaluated by microscopic examination of samples subjected to reclaiming conditions for excessive production of crosslinked gels or membrane gels. The gelling characteristics may be evaluated in terms of gel particle size and amounts relative to those for known reclaimable products. Odor may be evaluated relative to odor production for known reclaimable products.

The present invention is illustrated by the following examples wherein all parts, percentages, and ratios are by weight, and all temperatures are in °C. unless indicated to the contrary:

EXAMPLE 1

The components and their relative amounts which may be used to obtain an aqueous coating composition and a dry coating in accordance with the present invention are:

| Component | Weight % Based On Aqueous Coating Composition | Weight % Based On Dry Coating |
|---|---|---|
| Acrylic copolymer | 7.0 | 53.02 |
| Antistatic copolymer | 4.0 | 30.30 |
| Glycidoxy Silane (Z6040) | 1.0 | 7.58 |
| Silica Gel (Syloid 74) | 0.6 | 4.55 |
| Wax | 0.6 | 4.55 |
| Carrier (water) | 86.8 | — |
|  | 100.0 | 100.0 |

The acrylic copolymer is 60% by weight of methyl methacrylate and 40% by weight of ethyl acrylate.

The antistatic copolymer is a crosslinked acrylic-based copolymer which is: (1) 65% by weight of the dimethylsulfate quaternary salt of dimethylaminomethyl methacrylate, (2) 30% by weight of methyl methacrylate, and (3) 5% by weight of N-methylolacrylamide.

The glycidoxy silane is Dow Corning's Z6040 which is glycidoxypropyl trimethoxysilane.

The silica gel employed is Syloid 74 sold by W. R. Grace and Company, Baltimore, Md. The Syloid 74 silica gel has an average particle size of 8μ, a silica particle density of 0.65 grams per cc, and an average pore diameter of 150 Angstroms.

The wax employed is the solids content of a commercially available wax emulsion, Michem®LUBE 18130 sold by Michelman, Inc., of Cincinnati, Ohio. The wax emulsion is a non-anionic emulsion having a light yellow, thin, semi-translucent liquid appearance. The total solids content of the product is from about 29.5% to about 30.5% by weight, with the balance being water. The solids are a synthetic wax based upon Epolene® E14 wax. The Epolene® E14 emulsifiable wax has a ring and ball softening point of 104° C., a penetration hardness of (100 g/5 sec./25° C., tenths of mm) of 4, a density of 0.94 g/cc. at 25° C., an acid number of 16, a Brookfield thermosel viscosity cP at 125° C. of 225, and at 140° C. of 160. The Epolene® E14 has a molecular weight, GPC of 3600 (weight average molecular weight, $M_w$) and 1300 (number average molecular weight, $M_n$).

The coating composition is produced at room temperature in a mixing vessel. First, the water is added to the vessel, followed by the addition of the glycidoxy silane with mixing. The mixture is allowed to stand for approximately 30 minutes to at least substantially hydrolyze the glycidoxy silane. The acrylic copolymer may then be added with continued mixing to achieve substantial homogeneity. The antistatic copolymer may be added next with mixing to achieve substantial homogeneity. The emulsified wax may then be added with continued mixing to obtain a uniform mixture. The silica gel may then be added with mixing to avoid agglomeration or lumping and to obtain a substantial homogeneous aqueous-based coating composition.

A 56 mil thick polyethylene terephthalate (PET) film was extruded at temperatures of about 250°–300° C. onto a casting wheel. It was then uniaxially oriented in the machine direction about 3.5 times. The aqueous-based coating composition was then coated onto both sides of the film and dried in an oven at about 100° C. for about 5 seconds.

The film was oriented in the transverse direction about 4.0 times to yield an overhead transparency sheet having a dry coating weight of about 0.2 g/sq. meter on each side.

Comparative Example 1

An aqueous-based coating composition was prepared using the same ingredients and mixing method as in Example 1 except no acrylic copolymer was employed. The aqueous-based coating composition was coated onto polyethylene terephthalate film to obtain an overhead transparency sheet having a dry coating weight of about 0.2 g/sq. meter on each side in the same manner as in Example 1. The ingredients and their relative amounts used to obtain the aqueous-based coating composition and the dry coating were:

| Component | Weight % Based On Aqueous Coating Composition | Weight % Based On Dry Coating |
|---|---|---|
| Acrylic copolymer | 0.0 | 0.00 |
| Antistatic copolymer | 11.0 | 85.27 |
| Glycidoxy Silane (Z6040) | 1.0 | 7.75 |
| Silica Gel (Syloid 74) | 0.3 | 2.33 |
| Wax | 0.6 | 4.65 |
| Carrier (water) | 87.1 | — |
|  | 100.0 | 100.0 |

The overhead transparency sheets of Example 1 and Comparative Example 1 were reclaimed by mechanical means, involving grinding of the sheets, and subjecting the ground sheets to reclamation temperatures, in excess of about 250° C. and made into 3 mil film.

The reclaimability, coefficients of friction, surface haze, surface resistivity, smear, and rub-off of the overhead transparent sheets of Example 1 and Comparative Example 1 were tested according to the above-described test methods. The results are shown in Table 1:

TABLE 1

| Example | Sides Coated | Coating (Weight %) | | | | | | | Properties of Overhead Transparency | | | | Reclaimability | | |
|---|---|---|---|---|---|---|---|---|---|---|---|---|---|---|---|
| | | Acrylic Co-polymer | Antistatic Co-polymer | Z6040 Glycidoxy Silane | Wax | Silica Syloid 74 | COFs | COFk | Surface Haze | Surface Resistivity $(10^{11})$ Ohms/Sq. | Smear 0 = Good | Ruboff 0 = Good | Odor | Yellowing | Gel Formation |
| 1 | 2 | 53.02 | 30.30 | 7.58 | 4.55 | 4.55 | 0.29 | 0.28 | 2.81 | 4.80 | 0 | 1.5 | acceptable | acceptable | acceptable |
| Comp 1 | 2 | 0 | 85.27 | 7.75 | 4.65 | 2.33 | 0.28 | 0.28 | 2.61 | 0.26 | 0 | 1.5 | not acceptable | not acceptable | not acceptable |

The reclamation of the overhead transparency sheet of Comparative Example 1, which did not contain the acrylic copolymer, resulted in excessive yellowing, odor, and membrane gels formed from the coating. Replacement of a substantial amount of the antistatic copolymer with the acrylic copolymer as in Example 1 resulted in substantial improvement in all aspects of reclaimability. Yellowness, odor, and gel formation during reclamation of the overhead transparent sheet of Example 1 were all acceptable.

As shown in Table 1, the overhead transparent sheet of Comparative Example 1 exhibited better surface resistivity and lower surface haze than exhibited by the sheet of Example 1. The static and kinetic coefficients of friction, the smear, and ruboff were all comparable. However, the sheet of Comparative Example 1 was not reclaimable.

EXAMPLES 2–9

In Examples 2 through 9, aqueous-based coating compositions of the present invention were prepared using the same ingredients and mixing method as in Example 1. The level of antistatic copolymer was kept at 4% by weight, based upon the total weight of the aqueous coating composition to maintain the ability to reclaim the transparent, coated film. Amounts were varied from 3% by weight to 7% by weight for the acrylic copolymer, from 1% by weight to 2% by weight for the glycidoxy silane, from 0.6% by weight to 1% by weight for the wax, and from 0.6% by weight to 1% by weight for the silica gel. Each of the aqueous-based coating compositions were coated onto polyethylene terephthalate film to obtain an overhead transparency sheet having a dry coating weight of about 0.2 g/sq. meter on each side in the same manner as in Example 1. The ingredients and their relative amounts used to obtain the aqueous-based coating composition and the dry coating are presented in Table 2:

TABLE 2

| | Aqueous Coating Composition | | | | | | | Dry Coating | | | | | |
|---|---|---|---|---|---|---|---|---|---|---|---|---|---|
| Example | Weight % Acrylic Co-polymer | Weight % Antistatic Co-polymer | Weight % Glycidoxy Silane | Weight % Silica Gel | Weight % Wax | Weight % Carrier (Water) | TOTAL | Weight % Acrylic Co-polymer | Weight % Antistatic Co-polymer | Weight % Glycidoxy Silane | Weight % Silica Gel | Weight % Wax | TOTAL |
| 2 | 3.0 | 4.0 | 1.0 | 0.6 | 0.6 | 90.8 | 100.0 | 32.61 | 43.48 | 10.87 | 6.52 | 6.52 | 100.0 |
| 3 | 7.0 | 4.0 | 1.0 | 1.0 | 0.6 | 86.4 | 100.0 | 51.48 | 29.41 | 7.35 | 7.35 | 4.41 | 100.0 |
| 4 | 3.0 | 4.0 | 2.0 | 1.0 | 0.6 | 89.4 | 100.0 | 28.30 | 37.74 | 18.87 | 9.43 | 5.66 | 100.0 |
| 5 | 7.0 | 4.0 | 2.0 | 0.6 | 0.6 | 85.8 | 100.0 | 49.30 | 28.16 | 14.08 | 4.23 | 4.23 | 100.0 |
| 6 | 3.0 | 4.0 | 1.0 | 1.0 | 1.0 | 90.0 | 100.0 | 30.00 | 40.00 | 10.00 | 10.00 | 10.00 | 100.0 |
| 7 | 7.0 | 4.0 | 1.0 | 0.6 | 1.0 | 86.4 | 100.0 | 51.48 | 29.41 | 7.35 | 4.41 | 7.35 | 100.0 |
| 8 | 3.0 | 4.0 | 2.0 | 0.6 | 1.0 | 89.4 | 100.0 | 28.30 | 37.74 | 18.87 | 5.66 | 9.43 | 100.0 |
| 9 | 7.0 | 4.0 | 2.0 | 1.0 | 1.0 | 85.0 | 100.0 | 46.66 | 26.67 | 13.33 | 6.67 | 6.67 | 100.0 |

The coefficients of friction, smoothness (Bekk numbers), surface haze, surface resistivity, smear, ruboff, and singulation of the overhead transparent sheets were tested according to the above-identified test methods. The results are shown in Table 3:

TABLE 3

| | | Coating (Weight %) | | | | | Properties of Overhead Transparency | | | | | | |
|---|---|---|---|---|---|---|---|---|---|---|---|---|---|
| Example | Sides Coated | Acrylic Co-polymer | Antistatic Co-polymer | Z6040 Glycidoxy Silane | Wax | Silica Syloid 74 | COFs | COFk | Smoothness (Bekk Seconds) | Surface Haze | Surface Resistivity $(10^{11})$ Ohms/Sq. | Smear 0 = Good | Ruboff 0 = Good | Singulation |
| 2 | 2 | 32.61 | 43.48 | 10.87 | 6.52 | 6.52 | 0.24 | 0.23 | 5365 | 3.26 | 2.28 | 0 | 1.5 | Marginal |
| 3 | 2 | 51.48 | 29.41 | 7.35 | 4.41 | 7.35 | 0.28 | 0.28 | 1777 | 5.87 | 8.34 | 0 | 1.5 | Good |
| 4 | 2 | 28.30 | 37.74 | 18.87 | 5.66 | 9.43 | 0.27 | 0.27 | 2122 | 5.66 | 1.83 | 0 | 1.5 | Good |
| 5 | 2 | 49.30 | 28.16 | 14.08 | 4.23 | 4.23 | 0.27 | 0.27 | 2353 | 3.77 | 4.11 | 1 | 3.5 | Good |
| 6 | 2 | 30.00 | 40.00 | 10.00 | 10.00 | 10.00 | 0.24 | 0.24 | 2236 | 5.69 | 3.00 | 0.5 | 3 | Good |
| 7 | 2 | 51.48 | 20.41 | 7.35 | 7.35 | 4.41 | 0.24 | 0.24 | 1737 | 4.17 | 7.22 | 0 | 1.5 | Good |
| 8 | 2 | 28.30 | 37.74 | 18.87 | 9.43 | 5.66 | 0.22 | 0.22 | 2124 | 4.03 | 1.93 | 1 | 2 | Good |
| 9 | 2 | 46.66 | 26.67 | 13.33 | 6.67 | 6.67 | 0.28 | 0.27 | 1099 | 6.60 | 4.38 | 0.5 | 2 | Good |

As shown in Table 3, decreasing the amount of antistatic copolymer, based upon the dry weight of the coating, to further assure reclaimability tends to increase surface resistivity. However, the static and kinetic coefficients of friction and singulation were acceptable in each case. Increasing the wax content and increasing the silica content tends to increase ruboff as indicated by Examples 2 and 6. Increasing the wax content and decreasing the silica content may be used to maintain similar smoothness or Bekk numbers as shown by Examples 3 and 7 and 4 and 8.

EXAMPLES 10–13

Comparative Example 2

In Examples 10 through 13 and Comparative Example 2 aqueous-based coating compositions were prepared using the same ingredients and mixing method as in Example 1. The level of antistatic copolymer was kept at 4% by weight, based upon the total weight of the aqueous coating composition to maintain the ability to reclaim the transparent, coated film. Increasing levels of silica gel were used to reduce smoothness or decrease (improve) Bekk numbers. Wax levels and glycidoxy silane levels were raised to maintain coefficients of friction and ruboff. Each of the aqueous-based coating compositions were coated onto polyethylene terephthalate film to obtain an overhead transparency sheet having a dry coating weight of about 0.2 g/sq. meter in the same manner as in Example 1 except only one side was coated. The ingredients and their relative amounts used to obtain the aqueous-based coating composition and the dry coating are presented in Table 4:

TABLE 4

| | Aqueous Coating Composition | | | | | | | Dry Coating | | | | | |
|---|---|---|---|---|---|---|---|---|---|---|---|---|---|
| Example | Weight % Acrylic Co-polymer | Weight % Antistatic Co-polymer | Weight % Glycidoxy Silane | Weight % Silica Gel | Weight % Wax | Weight % Carrier (Water) | TO-TAL | Weight % Acrylic Co-polymer | Weight % Antistatic Co-polymer | Weight % Glycidoxy Silane | Weight % Silica Gel | Weight % Wax | TO-TAL |
| 10 | 7.0 | 4.0 | 2.0 | 0.6 | 1.5 | 84.9 | 100.0 | 46.36 | 26.49 | 13.25 | 3.97 | 9.93 | 100.0 |
| 11 | 7.0 | 4.0 | 2.0 | 1.2 | 0.6 | 85.2 | 100.0 | 47.30 | 27.03 | 13.51 | 8.11 | 4.05 | 100.0 |
| 12 | 7.0 | 4.0 | 3.0 | 2.0 | 1.5 | 82.5 | 100.0 | 40.00 | 22.86 | 17.14 | 11.43 | 8.57 | 100.0 |
| 13 | 7.0 | 4.0 | 3.0 | 2.0 | 1.0 | 83.0 | 100.0 | 41.18 | 23.53 | 17.65 | 11.76 | 5.88 | 100.0 |
| Comp. 2 | 7.0 | 4.0 | 2.0 | 3.0 | 0.6 | 83.4 | 100.0 | 42.17 | 24.10 | 12.05 | 18.07 | 3.61 | 100.0 |

The coefficients of friction, smoothness (Bekk numbers), surface haze, surface resistivity, smear, and ruboff of the overhead transparent sheets were tested according to the above-identified test methods. The results are shown in Table 5:

TABLE 5

| | | Coating (Weight %) | | | | | | Properties of Overhead Transparency | | | | |
|---|---|---|---|---|---|---|---|---|---|---|---|---|
| Example | Sides Coated | Acrylic Copolymer | Antistatic Co-polymer | Z6040 Glycidoxy Silane | Wax | Silica Syloid 74 | COFs | COFk | Smoothness (Bekk Seconds) | Surface Haze | Surface Resistivity ($10^{11}$) Ohms/Sq. | Smear 0 = Good | Ruboff 0 = Good |
| 10 | 1 | 46.36 | 26.49 | 13.25 | 9.93 | 3.97 | 0.26 | 0.26 | 3967 | 1.84 | 7.03 | 3 | 3 |
| 11 | 1 | 47.30 | 27.03 | 13.51 | 4.05 | 8.11 | 0.35 | 0.33 | 1893 | 5.03 | 12.7 | 0 | 2.5 |
| 12 | 1 | 40.00 | 22.86 | 17.14 | 8.57 | 11.43 | 0.34 | 0.31 | 1199 | 5.43 | 14.8 | 3 | 2.5 |
| 13 | 1 | 41.18 | 23.53 | 17.65 | 5.88 | 11.76 | 0.37 | 0.35 | 1233 | 5.07 | 22.3 | 3 | 2.5 |
| Comp. 2 | 1 | 42.17 | 24.10 | 12.05 | 3.61 | 18.07 | 0.45 | 0.40 | 1101 | 7.36 | 267 | 2 | 3 |

As shown in Table 5, increasing the amount of silica decreases the Bekk value or decreases smoothness (which tends to promote better singulation). However, increasing the amount of silica also tends to increase the static and kinetic coefficients of friction, surface resistivity, and surface haze. Higher levels of wax to reduce coefficients of friction and higher levels of glycidoxy silane to bond the silica and reduce ruboff may be used, but higher levels of wax and silane tend to increase smear as shown by Comparative Example 2 and Examples 12 and 13.

I claim:

1. A transparent image-recording sheet which can be reclaimed without substantial yellowing or gel formation comprising a transparent base sheet coated on at least one image-recording surface with a transparent toner-receptive coating, said coating comprising
   a) from about 60% by weight to about 85% by weight of a polymeric antistatic binder composition which does not substantially form a gel or yellow upon heating to reclamation temperatures,
   b) from about 5% by weight to about 20% by weight of a glycidoxy silane,
   c) from about 3% by weight to about 12% by weight of a wax, and
   d) from about 3% by weight to about 15% by weight of a particulate material having a mean particle size of from 4 μm to 15 μm,
the weight percentages of components a) through d) adding up to 100%.

2. A transparent image-recording sheet as claimed in claim 1 wherein said polymeric antistatic binder composition comprises
   i) from about 25% by weight to about 55% by weight of an acrylic polymer or copolymer, based upon the weight of components a) through d), and
   ii) from about 20% by weight to about 45% by weight of an antistatic copolymer, based upon the weight of components a) through d).

3. A transparent image-recording sheet as claimed in claim 2 wherein said acrylic polymer or copolymer is a copolymer of methyl methacrylate and ethyl acrylate.

4. A transparent image-recording sheet as claimed in claim 3 wherein said antistatic copolymer is a copolymer of:
   1) from about 60% by weight to about 85% by weight of a quaternary salt of an alkylamino acrylamide or an alkylamino acrylate,
   2) from about 5% by weight to about 40% by weight of one or more acrylates, and
   3) from 0 to about 10% by weight of a crosslinker,
wherein the total weight percent of components 1, 2, and 3 equals 100%.

5. A transparent image-recording sheet as claimed in claim 1 wherein the amount of crosslinker in said coating is less than about 6% by weight, based upon the weight of said polymeric antistatic binder composition.

6. A transparent image-recording sheet as claimed in claim 1 wherein said particulate material is silica gel.

7. A transparent image-recording sheet as claimed in claim 1 wherein the total amount of nitrogenous antistatic compound used in producing said coating is from about 21% by weight to about 55% by weight based upon the weight of said polymeric antistatic binder composition.

8. A transparent image-recording sheet as claimed in claim 7 wherein the nitrogenous antistatic compounds used in producing said coating consist essentially of a copolymerizable quaternary ammonium salt.

9. A transparent image-recording sheet as claimed in claim 4 wherein said quaternary salt is a quaternary salt of an alkylamino acrylate, said salt having the general formula (I):

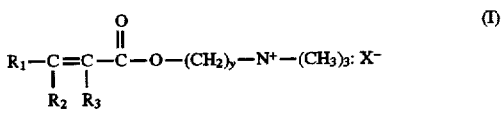

wherein $R_1$, $R_2$ and $R_3$ may be hydrogen or an alkyl group containing 1–8 carbon atoms and wherein $R_1$, $R_2$ and $R_3$ may be the same or different; y is 1 to 8; and X may be an anion selected from the group consisting of halides, sulfates, sulfonates, alkyl sulfonates, carbonates, alkyl carbonates, nitrates, phosphates, and alkyl phosphates.

10. A transparent image-recording sheet as claimed in claim 9 where salt quaternary salt is the dimethyl sulfate quaternary salt of dimethylaminoethyl methacrylate.

11. A transparent image-recording sheet as claimed in claim 4 wherein said quaternary salt is a quaternary salt of an alkylamino acrylamide, said salt having the general formula (II):

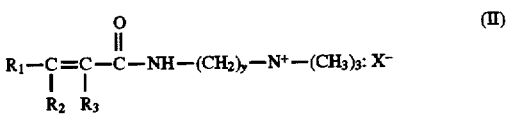

wherein $R_1$, $R_2$ and $R_3$ may be hydrogen or an alkyl group containing 1–8 carbon atoms and wherein $R_1$, $R_2$ and $R_3$ may be the same or different; y is 1 to 8; and X may be an anion selected from the group consisting of halides, sulfates, sulfonates, alkyl sulfonates, carbonates, alkyl carbonates, nitrates, phosphates, and alkyl phosphates.

12. A transparent image-recording sheet as claimed in claim 4 wherein said one or more acrylates are selected from the group comprising methyl acrylate, ethyl acrylate, propyl acrylate, butyl acrylate, methacrylate, methyl methacrylate, ethyl methacrylate, propyl methacrylate, hexyl acrylate, 2-ethyl-hexyl acrylate, and octyl acrylate.

13. A transparent image-recording sheet as claimed in claim 4 wherein said crosslinker is selected from the group consisting of:
   N-methylolacrylamide,
   N-methylol methacrylamide,
   melamine or urea formaldehyde crosslinked with one or more of itaconic acid, itaconic anhydride, acrylic acid, allyl alcohol, maleic acid, or maleic anhydride,
   acrylamide and methacrylamide crosslinked with melamine formaldehyde or urea formaldehyde,
   aziridines,
   glycouril-formaldehyde,
   benzoguanamines,
   acrylamido glycolic acid,
   bis-acrylamide glycol,
   glyoxal,
   formaldehyde, and
   diacrylamide acetic acid.

14. A transparent image-recording sheet as claimed in claim 1 wherein said base sheet is biaxially oriented polyester.

15. A transparent image-recording sheet as claimed in claim 1 wherein said coating is on both sides of said base sheet.

16. A transparent image-recording sheet as claimed in claim 1 wherein said coating on said base sheet is from 0.003 g/m² to 0.4 g/m².

17. A transparent image-recording sheet as claimed in claim 1 wherein said image recording sheet has a surface resistivity of less than about $1.25 \times 10^{12}$ ohms/square, static coefficient of friction of less than about 0.32, and a surface smoothness of less than about 3000 Bekk seconds.

18. A transparent image-recording sheet as claimed in claim 1 wherein the mean particle size of said particulate material is from 7 μm to 12 μm.

19. A transparent image-recording sheet for use in a plain paper copier which can be reclaimed without substantial yellowing or gel formation comprising a transparent base sheet coated on at least one image-recording surface with a transparent toner-receptive coating, said coating comprising:

a) from about 25% by weight to about 55% by weight of an acrylic polymer or copolymer, b) from about 20% by weight to about 45% by weight of an antistatic copolymer, wherein said antistatic copolymer is a copolymer of:
1) from about 60% by weight to about 85% by weight of a quaternary salt of an alkylamino acrylamide or an alkylamino acrylate,
2) from about 5% by weight to about 40% by weight of one or more acrylates, and
3) from 0 to about 10% by weight of a crosslinker, wherein the total weight percent of components 1, 2, and 3 equals 100%, c) from about 5% by weight to about 20% by weight of a glycidoxy silane, d) from about 3% by weight to about 12% by weight of a wax, and e) from about 3% by weight to about 15% by weight of silica gel having a mean particle size of from 4 μm to 15 μm, the weight percentages of components a) through e) adding up to 100%.

20. A transparent image-recording sheet as claimed in claim 19 wherein said acrylic polymer or copolymer is a copolymer of methyl methacrylate and ethyl acrylate.

21. A transparent image-recording sheet as claimed in claim 20 wherein said wax is a wax emulsion of polyethylene.

22. A coating composition for coating a polymeric film for making a transparent image-recording sheet which can be reclaimed without substantial yellowing or gel formation, said coating composition comprising:

a) from about 25% by weight to about 55% by weight of an acrylic polymer or copolymer, b) from about 20% by weight to about 45% by weight of an antistatic copolymer, wherein said antistatic copolymer is a copolymer of:
1) from about 60% by weight to about 85% by weight of a quaternary salt of an alkylamino acrylamide or an alkylamino acrylate,
2) from about 5% by weight to about 40% by weight of one or more acrylates, and
3) from 0 to about 10% by weight of a crosslinker, wherein the total weight percent of components 1, 2, and 3 equals 100%, c) from about 5% by weight to about 20% by weight of a glycidoxy silane, d) from about 3% by weight to about 12% by weight of a wax, and e) from about 3% by weight to about 15% by weight of silica gel having a mean particle size of from 4 μm to 15 μm, the weight percentages of components a) through e) adding up to 100%.

23. A coating composition as claimed in claim 22 wherein the mean particle size of said silica gel is from 7 μm to 12 μm.

24. A coating composition as claimed in claim 22 wherein said acrylic polymer or copolymer is a copolymer of methyl methacrylate and ethyl acrylate.

25. A coating composition as claimed in claim 22 wherein said wax is a wax emulsion of polyethylene.

26. A coating composition as claimed in claim 22 wherein said quaternary salt is a quaternary salt of an alkylamino acrylate, said salt having the general formula (I):

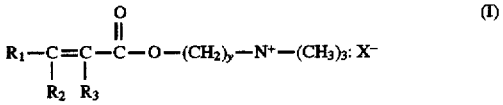

wherein $R_1$, $R_2$ and $R_3$ may be hydrogen or an alkyl group containing 1–8 carbon atoms and wherein $R_1$, $R_2$ and $R_3$ may be the same or different; y is 1 to 8; and X may be an anion selected from the group consisting of halides, sulfates, sulfonates, alkyl sulfonates, carbonates, alkyl carbonates, nitrates, phosphates, and alkyl phosphates.

27. A coating composition as claimed in claim 26 wherein said quaternary salt is the dimethyl sulfate quaternary salt of dimethylaminoethyl methacrylate.

28. A coating composition as claimed in claim 22 wherein said quaternary salt is a quaternary salt of an alkylamino acrylamide, said salt having the general formula (II):

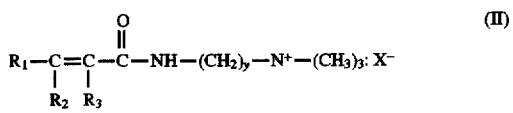

wherein $R_1$, $R_2$ and $R_3$ may be hydrogen or an alkyl group containing 1–8 carbon atoms and wherein $R_1$, $R_2$ and $R_3$ may be the same or different; y is 1 to 8; and X may be an anion selected from the group consisting of halides, sulfates, sulfonates, alkyl sulfonates, carbonates, alkyl carbonates, nitrates, phosphates, and alkyl phosphates.

29. A coating composition as claimed in claim 22 wherein said one or more acrylates of said antistatic copolymer are selected from the group comprising methyl acrylate, ethyl acrylate, propyl acrylate, butyl acrylate, methacrylate, methyl methacrylate, ethyl methacrylate, propyl methacrylate, hexyl acrylate, 2-ethyl-hexyl acrylate, and octyl acrylate.

30. A coating composition as claimed in claim 22 wherein said crosslinker is N-methylolacrylamide.

31. A method for making a transparent image-recording sheet which can be reclaimed without substantial yellowing or gel formation comprising:

A) coating a polymeric film on at least one surface with a toner-receptive coating composition, said coating composition comprising
a) from about 60% by weight to about 85% by weight of a polymeric antistatic binder composition which does not substantially gel or yellow upon heating to reclamation temperatures,
b) from about 5% by weight to about 20% by weight of a glycidoxy silane,
c) from about 3% by weight to about 12% by weight of a wax, and
d) from about 3% by weight to about 15% by weight of a particulate material having a mean particle size of from 4 μm to 15 μm, the weight percentages of components a) through d) adding up to 100%, and B) drying said coating composition on said film to obtain a transparent image-recording sheet.

32. A method as claimed in claim 31 wherein said polymeric antistatic binder composition comprises
i) from about 25% by weight to about 55% by weight of an acrylic polymer or copolymer, based upon the weight of components a) through d), and
ii) from about 20% by weight to about 45% by weight of an antistatic copolymer, based upon the weight of components a) through d).

33. A method as claimed in claim 32 wherein said acrylic polymer or copolymer is a copolymer of methyl methacrylate and ethyl acrylate.

34. A method as claimed in claim 33 wherein said antistatic copolymer is a copolymer of:
1) from about 60% by weight to about 85% by weight of a quaternary salt of an alkylamino acrylamide or an alkylamino acrylate,
2) from about 5% by weight to about 40% by weight of one or more acrylates, and
3) from 0 to about 10% by weight of a crosslinker, wherein the total weight percent of components 1, 2, and 3 equals 100%.

35. A method as claimed in claim 31 wherein the amount of crosslinker in said coating composition is less than about 6% by weight, based upon the weight of said polymeric antistatic binder composition.

36. A method as claimed in claim 31 wherein said particulate material is silica gel.

37. A method as claimed in claim 34 wherein said quaternary salt is a quaternary salt of an alkylamino acrylate, said salt having the general formula (I):

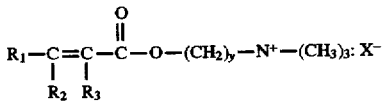

wherein $R_1$, $R_2$ and $R_3$ may be hydrogen or an alkyl group containing 1–8 carbon atoms and wherein $R_1$, $R_2$ and $R_3$ may be the same or different; y is 1 to 8; and X may be an anion selected from the group consisting of halides, sulfates, sulfonates, alkyl sulfonates, carbonates, alkyl carbonates, nitrates, phosphates, and alkyl phosphates.

38. A method as claimed in claim 34 wherein said quaternary salt is a quaternary salt of an alkylamino acrylamide, said salt having the general formula (II):

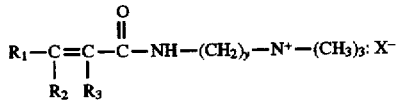

wherein $R_1$, $R_2$ and $R_3$ may be hydrogen or an alkyl group containing 1–8 carbon atoms and wherein $R_1$, $R_2$ and $R_3$ may be the same or different; y is 1 to 8; and X may be an anion selected from the group consisting of halides, sulfates, sulfonates, alkyl sulfonates, carbonates, alkyl carbonates, nitrates, phosphates, and alkyl phosphates.

39. A method as claimed in claim 34 wherein said one or more acrylates are selected from the group comprising methyl acrylate, ethyl acrylate, propyl acrylate, butyl acrylate, methacrylate, methyl methacrylate, ethyl methacrylate, propyl methacrylate, hexyl acrylate, 2-ethylhexyl acrylate, and octyl acrylate, and said crosslinker is selected from the group consisting of:

N-methylolacrylamide,

N-methylol methacrylamide, melamine or urea formaldehyde crosslinked with one or more of itaconic acid, itaconic anhydride, acrylic acid, allyl alcohol, maleic acid, or maleic anhydride, acrylamide and methacrylamide crosslinked with melamine formaldehyde or urea formaldehyde, aziridines, glycouril-formaldehyde, benzoguanamines, acrylamido glycolic acid, bis-acrylamide glycol, glyoxal, formaldehyde, and diacrylamide acetic acid.

40. A method as claimed in claim 31 wherein said film is biaxially oriented.

41. A method as claimed in claim 31 wherein said film is corona treated before being coated with said coating composition.

42. A method as claimed in claim 31 wherein said coating composition is applied to said polymeric film in-line during the manufacturing of said polymeric film.

43. A method as claimed in claim 42 wherein the coating composition is applied to said polymeric film intradraw during the film manufacturing process.

44. A method as claimed in claim 42 wherein the coating composition is applied to said film, on a dry weight basis, in a range of from 0.003 g/m$^2$ to 0.4 g/m$^2$.

45. A method as claimed in claim 31 wherein said image recording sheet has a surface resistivity of less than about $1.25 \times 10^{12}$ ohms/square, static coefficient of friction of less than about 0.32, and a surface smoothness of less than about 3000 Bekk seconds, and the mean particle size of said particulate material is from 7 µm to 12 µm.

46. A transparent image-recording sheet for use in a plain paper copier which can be reclaimed without substantial yellowing or gel formation comprising a transparent base sheet coated on at least one image-recording surface with a transparent toner-receptive coating, said coating comprising:
a) from about 25% by weight to about 55% by weight of a copolymer of methyl methacrylate and ethyl acrylate,
b) from about 20% by weight to about 45% by weight of an antistatic copolymer, wherein said antistatic copolymer is a copolymer of:
1) from about 60% by weight to about 85% by weight of a quaternary salt of an alkylamino acrylamide or an alkylamino acrylate,
2) from about 5% by weight to about 40% by weight of one or more acrylates, and
3) from 0 to about 10% by weight of a crosslinker, wherein the total weight percent of components 1, 2, and 3 equals 100%,
c) a glycidoxy silane,
d) a wax, and
e) from about 3% by weight to about 15% by weight of silica gel having a mean particle size of from 4 µm to 15 µm, the weight percentages of components a) through e) adding up to 100%, wherein said image recording sheet has a surface resistivity of less than about $1.25 \times 10^{12}$ ohms/square, static coefficient of friction of less than about 0.32, and a surface smoothness of less than about 3000 Bekk seconds.

* * * * *